United States Patent [19]

Gardner

[11] Patent Number: 5,288,153
[45] Date of Patent: Feb. 22, 1994

[54] TILTING PAD JOURNAL BEARING USING DIRECTED LUBRICATION

[75] Inventor: Willis W. Gardner, Waukesha, Wis.

[73] Assignee: Delaware Capital Formation, Inc., Waukesha, Wis.

[21] Appl. No.: 191

[22] Filed: Jan. 4, 1993

[51] Int. Cl.⁵ .............................................. F16C 17/03
[52] U.S. Cl. ................................... 384/311; 384/117; 384/312
[58] Field of Search ............... 384/311, 312, 310, 309, 384/307, 117

[56] References Cited

U.S. PATENT DOCUMENTS

| | | |
|---|---|---|
| 3,807,814 | 4/1974 | Stopp . |
| 4,247,157 | 1/1981 | Sigg . |
| 4,300,808 | 11/1981 | Yoshioka . |
| 4,497,587 | 2/1985 | Pine . |
| 4,501,505 | 2/1985 | Chambers . |
| 4,568,204 | 2/1986 | Chambers . |
| 4,815,865 | 3/1989 | Gerling . |

FOREIGN PATENT DOCUMENTS

| | | |
|---|---|---|
| 1120624 | 7/1968 | United Kingdom . |
| 1199147 | 7/1970 | United Kingdom . |
| 1401425 | 7/1975 | United Kingdom . |

OTHER PUBLICATIONS

Glacier: "Tilting Pad Journal Bearings", Designers Handbook 10, p. 14, at 455-89 (no date).

Primary Examiner—Lenard A. Footland
Attorney, Agent, or Firm—Ryan, Kees & Hohenfeldt

[57] ABSTRACT

In a tilting pad journal directly lubricated bearing the axially spaced apart sidewalls of the tilting pads are provided with extensions that have an axial space between them and contribute to defining the boundaries of a cool oil infeed well whose other boundaries are radially extending walls of adjacent pads or walls that are defined by slotting the leading ends of the pads. The pads are contained within the circular opening of a supporting ring member which has an oil infeed groove around its periphery. In line with each of the oil infeed wells there is an oil infeed passageway for delivering oil to the shaft surface exposed in the well by means of an interposed row of jets or orifices. Cool oil is fed into the wells, such that the interface between the bearing pad and the shaft, which only has oil from the well available to it, necessarily runs on cooler oil. The arrangement permits elimination of the conventional oil sealing rings which pre-existing bearings participate in defining a path or oil flow which results in all parts of the bearing assembly being totally immersed in oil with a consequence of increased power loss and heating due to shearing of the greater quantity of oil in the prior designs.

6 Claims, 2 Drawing Sheets

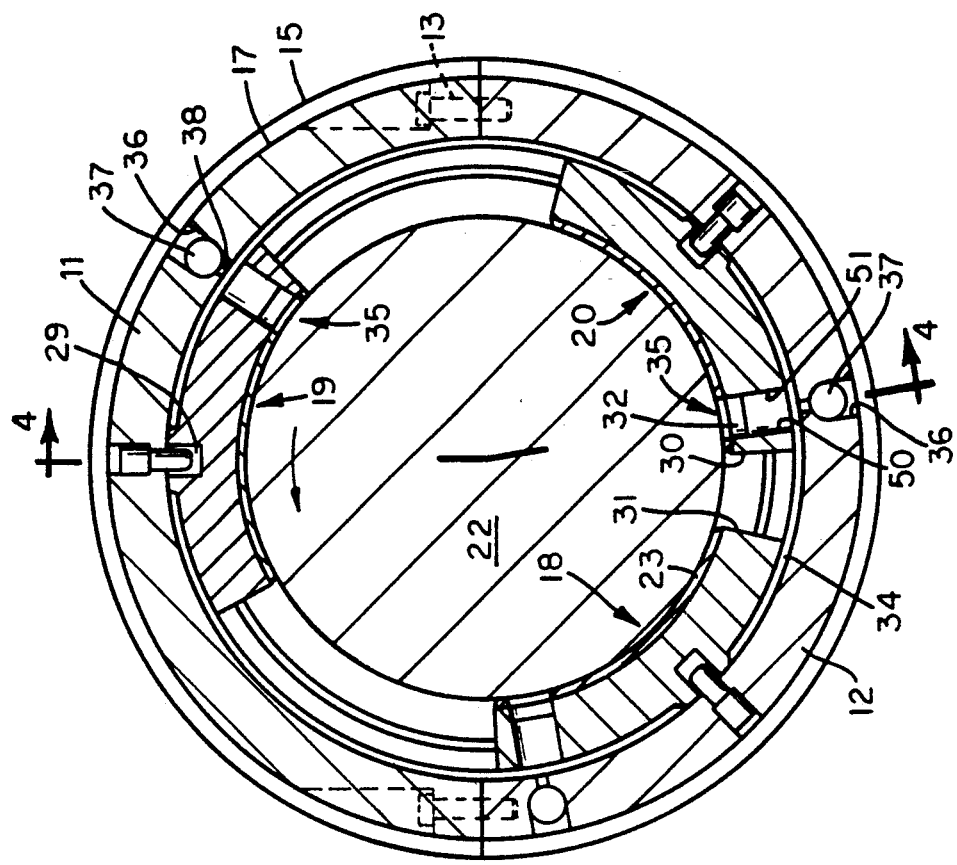
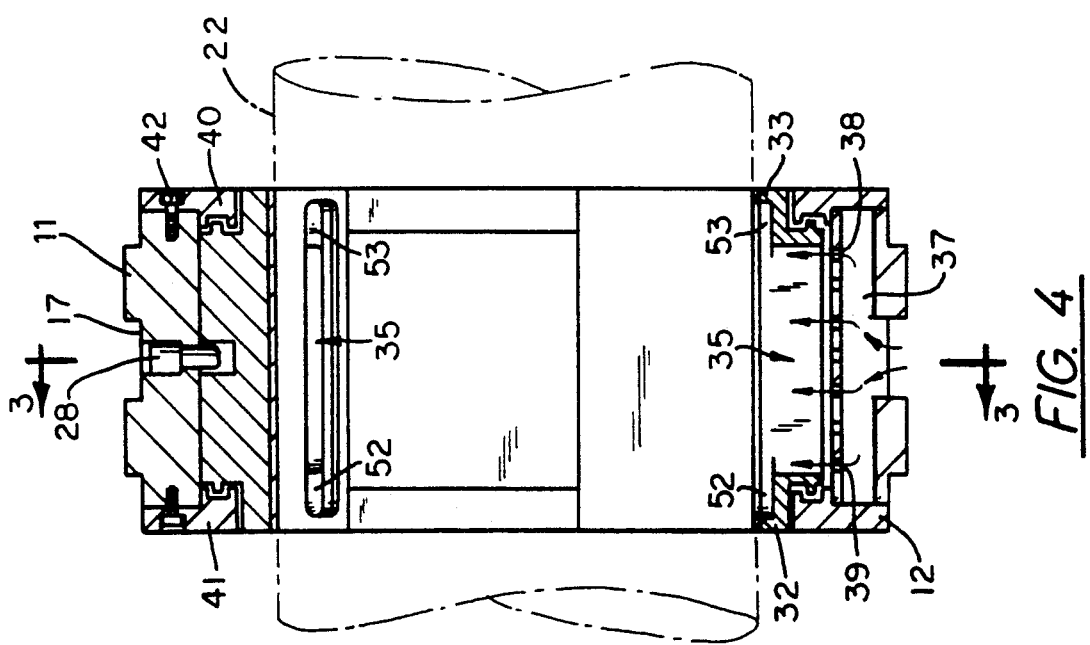

TILTING PAD JOURNAL BEARING USING DIRECTED LUBRICATION

BACKGROUND OF THE INVENTION

The invention disclosed herein pertains to a tilting pad journal bearing of the type comprising of a bearing shell in the form of a supporting ring member and a plurality of circumferentially spaced shaft supporting pads arranged within the ring member. Instead of the bearing interfaces between the pads and the shaft being lubricated by immersing the entire interior bearing assembly as is generally done in tilting pad bearings, the new bearing design disclosed herein provides for injecting lubrication directly onto the shaft between the trailing and leading ends of the circumferentially spaced apart tilting bearing pads.

The type of bearing to which the invention applies is one wherein the pads tilt through a small angle so as to create a thin wedge shape opening which is thickest between the leading end of the pads and the shaft and which tapers to a thinner wedge at the trailing end of the pad. This well known phenomena is involved with developing a film of oil between the bearing surface of the pad and the shaft such that the load is actually supported on the oil film. Of course, because the film of oil is sheared as the oil is dragged through the bearing interface, the oil temperature rises. As is well known, if the oil temperature rises sufficiently, its viscosity falls, and if the temperature rise is high enough, the oil thins to a point where there is a direct rubbing of the metal shaft on the metal bearing surfaces, resulting in greater friction which may increase the bearing temperature to destructive level.

In conventional tilting pad bearings wherein the pads are lubricated by flooding them and all other parts of the bearing assembly with oil, the oil is subjected to shearing and to a concomitant increase in its temperature simply by running over parts which are not even involved in creating low friction conditions at the interface of the shaft and the bearing pads. It is not unusual for a tilting bearing supporting a long shaft, such as one that is used to connect a turbine to an alternator of megawatt capacity, to experience power consumption on the order 0.3 to 0.5 percent of the total power output of the turbine.

It is known that some power loss in tilting pad bearings results from churning of the oil after it passes out from underneath the trailing end of the pads. Churning imparts energy to the oil and elevates its temperature. Another problem in connection with lubricating a tilting pad bearing is known as the hot oil over carry over problem. Since it is necessary to have some space between the leading and trailing edges of the circumferentially spaced apart bearing pads hot oil emerging from the pad and shaft interface at the trailing end of one pad has a tendency to be carried by the shaft under the leading end of the next ensuing pad. It would be most desirable if all of the oil introduced at the leading ends of the pads were freshly cooled oil instead of oil which has emerged from a preceding pad where it has gained a substantial amount of heat.

SUMMARY OF THE INVENTION

A principal objective of the invention is to provide for lubricating a tilting pad journal bearing in a manner which minimizes or markedly reduces hot oil carry over.

Another important objective of the invention is to lubricate a tilting pad journal bearing in a manner that allows eliminating the oils seal rings which are typically used in tilting pad bearings on axially opposite sides of the pads.

Other objectives of the invention are to provide a tilting pad journal bearing which has increased load carrying capacity, uses less oil, consumes less power, uses lower capacity pumping and oil cooling equipment.

The term "oil" is used herein as generic to any liquid lubricant that can be used to lubricate a tilting pad bearing. The leading end of the bearing pads as used herein, is defined as the end that is first met by any point on the periphery of the shaft when the shaft is rotating. The trailing end of a bearing pad is defined as the end at which said point departs from underneath the pad after the point has traversed the circumferential length of the pad surface which interfaces with the shaft.

According to one embodiment of the invention, a shell in the form of a supporting ring member surrounds a shaft in radial space relationship. A plurality of arcuate bearing pads are arranged circumferentially spaced apart in the space between the ring member and the shaft. The pads have a radially inwardly presented curved bearing face interfacing with the shaft and have an opposite face presented radially outwardly toward and substantially contiguous with the ring member. The pads have leading and trailing ends spaced from each other in the direction of shaft rotation, and they have opposite axially spaced apart sidewalls which have extensions along the periphery of the shaft for defining between them an oil receiving well. The pad supporting ring member has an oil infeed passageway aligned with each well and there are jets or orifices for injecting oil into the well directly toward the shaft.

In one embodiment, the sidewall extensions that define the wells extend from the trailing ends of the pads so that cooled, fresh oil, that is injected at substantial pressure into the wells from the passageways in the supporting ring member, displaces or flushes out some of the hot carryover oil and mixes with the rest before the oil, which is injected through jets at the bottom of the wells, enters between the interface of the next bearing pad and the shaft.

In another embodiment, the extensions of the axially spaced apart sidewalls of the pads are bridged at their ends by an axially extending portion of the pad itself such that this portion or wall serves as a buffer and as one wall of a well. The other wall of the well is that part of the pad from which the sidewall extensions project.

How the above mentioned objectives and other more specific objectives of the inventions are achieved will be evident in the ensuing detailed description of the invention, which will now be set forth in reference to the drawings.

DESCRIPTION OF THE DRAWINGS

FIG. 3 is a section through an alternative embodiment of the new tilting pad journal bearing taken on a plane corresponding with 3—3 in FIG. 4; and, FIG. 4 is a section taken along a plane corresponding with 4—4 in FIG. 3.

DESCRIPTION OF A PREFERRED EMBODIMENT

Figure 1:
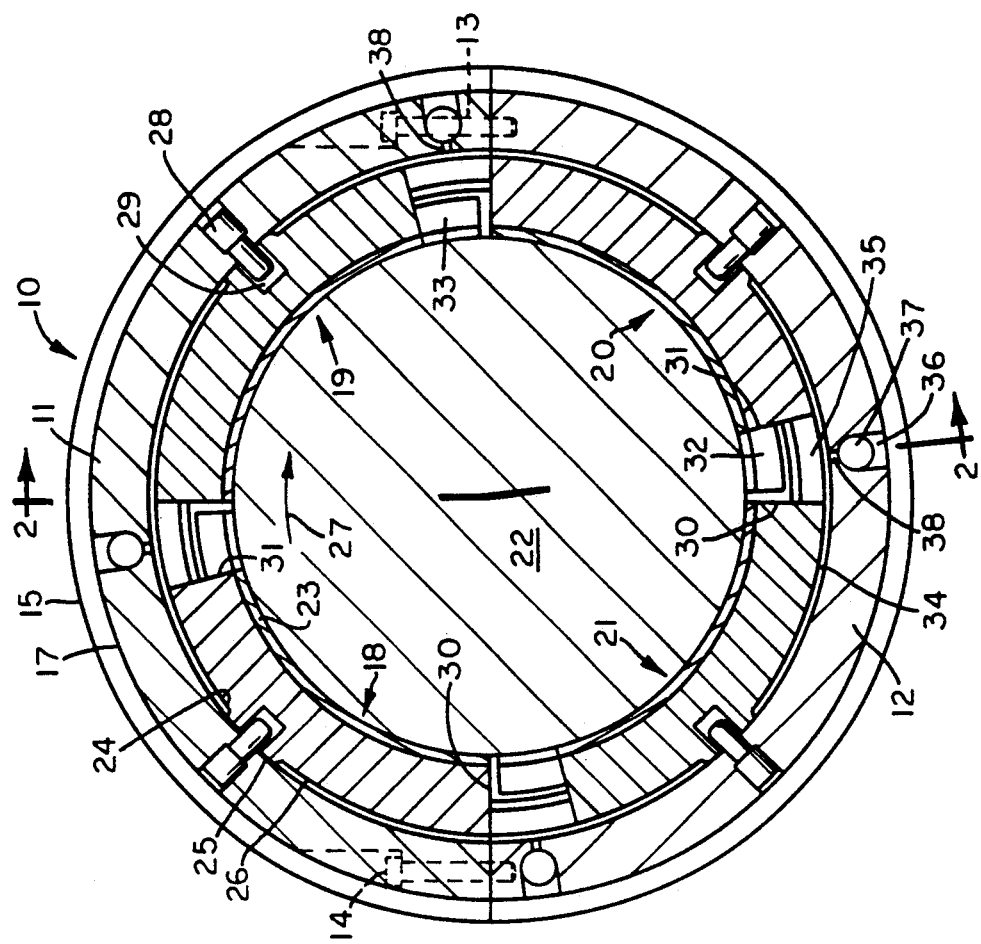
FIG. 1 is a section taken along a vertical plane corresponding with the plane 1—1 in FIG. 2.

In FIG. 1, the bearing assembly is indicated generally by the reference numeral 10. The assembly comprises a shell or a supporting split ring member which is composed of two semicircular sections 11 and 12. These sections are held together to form a ring by means of machine bolts 13 and 14. There are two annular ridges 15 and 16 on the periphery of the ring member as is apparent from inspection of FIGURE 2. An annular oil infeed channel 17 is defined between annular ridges 15 and 16. As is well known, the ring members are customarily contained within a casing, not shown, which confines the oil flow to the components of the bearing.

In the FIG. 1 embodiment of the new tilting pad journal bearing four arcuate bearing pads marked 18, 19, 20, and 21 are used to support the shaft 22 for rotation. A typical bearing pad 18 is curved as shown and has a babbitt layer 23 formed on it to provide a low friction lubricated bearing surface. Each pad has a radially outwardly presented curved surface 24 that is contiguous with ring member 11. Each pad has a riser 25 for enabling the pad to tilt by a small amount. A gap 26 between the outwardly presented surface 24 of the bearing pad and the inner curved surface 34 of ring member 11, provides clearance which allows the pad to tilt. The bearing functions in the conventional way in the respect that a wedge-shaped film of oil is developed at the interface of the babbitt coated bearing pad 23 and a periphery of shaft 22. In FIG. 1, the shaft is assumed to be rotating in the direction indicated by the arrow 27.

Because any point on the periphery of shaft 22 first encounters the end 30 of bearing pad 18, for example, end 30 is designated as the leading end of the bearing pad. Since that same point after having passed along the circumferential surface 23 of the bearing pad before departing out of the end 31, that end is designated the trailing end of the pad. It is evident from inspection of FIG. 1 that there is a space between the trailing end 31 of one pad and the leading end 30 of the next circumferentially spaced apart pad in the direction of rotation. In accordance with the invention, this interpad space provides for having circumferentially directed extensions on all of the pads, such as extensions 32 and 33 of the pad 20 sidewalls, for example. These extensions can be formed by simply milling out the space between the pad 23, extends over typical extension 32. Extensions 32 and 33, in conjunction with the surface of shaft 22, the inside face 34 of ring member 11, leading end 30, and trailing end 31 of the adjacent pad define the boundaries of what is herein called a lubricant well that is generally designated by the numeral 35. In FIG. 1, for example, one may see that an oil infeed passageway 36 in ring member 11 is aligned with each well 35. The infeed passageway communicates with annular oil infeed groove 17 that encircles supporting ring member 11. There is a transverse or axially extending hole 37 in ring member 11 to provide for distributing oil over the axial width of the bearing pads. The oil is under pressure and is projected into the well toward the surface of the shaft between the sidewall extensions 32 and 33 of the pads through the agency of a row of jets or orifices, one of which is marked 38 in FIG. 1. Thus, the high radial velocity of the oil fed into the well by the jets helps to expel and replace from the well much of the hot oil which has been heated and has emerged from the trailing end of the pad that precedes the well. Consequently, mostly fresh, cool oil is drawn under the leading end of the pad, which is an important achievement of the invention.

Figure 2:
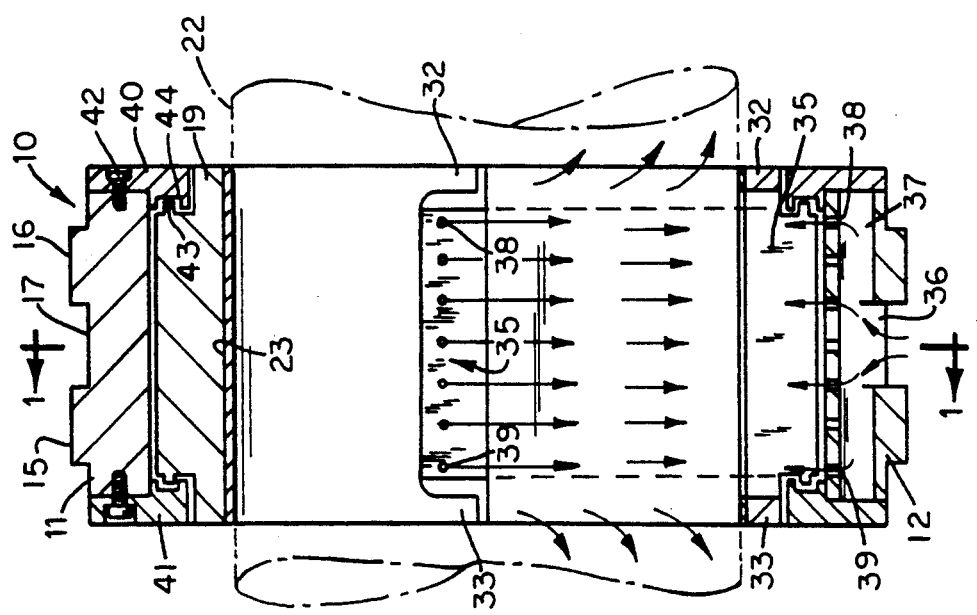
FIG. 2 is a section taken along the plane 2—2 in FIG. 1.

Attention is now invited to FIG. 2. One may see how oil is directed through the row of orifices, between those numbered 38 and 39, into the well 35.

FIG. 2 shows the retainer rings 40 and 41, which are used to prevent axial shifting of bearing pads 18-21. The pads are prevented from being carried circumferentially by the rotating shaft with pins 28 that fit into notches 29 with clearance so that the pads are not blocked against tilting as shown in FIGURE 1. Retainer rings 40 and 41 are secured to semicircular support ring members 11 and 12 by means of machine screws 42. It should be noted that a typical pad, such as the one marked 19 in FIG. 2, has a circumferentially extending ridge 43 that registers in a complementarily shaped annular groove 44 with a small gap or clearance. By this means, the pads are retained against dropping radially inwardly of the bearing assembly if the shaft 22 is not present. The gap ensures that the pads are free to tilt. Note in FIG. 2 that the oil in well 35 can extend over almost the entire axial width of the pad because of the large space between the pad sidewall extensions 32 and 33, which are two of the sides of the well. Note also in FIG. 2 that the conventional oil seals which are used on opposite axial ends of the bearing are advantageously omitted in the new bearing design.

In FIG. 2 arrows are generally used to indicate the oil flow paths that occur in the bearing. When the fresh oil is injected into the well 35, it and oil that is carried over from the trailing end of the preceding bearing pad mix so as to bring the average temperature of the mass of oil in the well down before that oil enters the interface between the bearing pad and the shaft. Some of the oil which forms the oil wedge between the pad and the shaft periphery is carried along in the wedge in the circumferential direction as indicated by some of the arrows and other fractions of the oil that is forced into the interface is necessarily relieved by flowing axially out of the sides of the bearing pads as indicated by arrows. Of course, when the oil emerges from the trailing ends and from the axially separated sides of the bearing pads it flows in the bearing assembly casing, not shown, and is drawn back to the oil recirculating pump, not shown, which is affiliated with a cooling coil or heat exchanger, not shown. Hence, it is only cooled oil that is fed to the wells 35 where it supplants much of the carryover oil and dilutes the rest of it so that cooler oil enters into the bearing pad/shaft interface.

Attention is now invited to FIGS. 3 and 4 for a discussion of an alternative embodiment of the invention. In these figures, parts which are similar to those described in connection with the FIGS. 1 and 2 embodiment are given the same reference numerals.

In FIGS. 3 and 4, only 3 bearing pads are used which is the case where certain special requirements have to be met as are known to those skilled in the art. The bearing pads are designated generally by the numerals 18, 19, and 20. Each pad has a babbitt bearing layer 23 that is interfaced with shaft 22. The supporting ring member composed of semicular parts 11 and 12 is also provided with an oil infeed channel 36 that communicates with annular oil infeed groove 17 in the periphery of the supporting ring member. There is a row of oil infeed orifices 38, 39, for feeding oil into a well 35 which is present in each of the bearing pads 18-20.

In the FIGS. 3 and 4 embodiment, the well 35 is actually bounded by surfaces similar to the previously discussed embodiment. However, the well is created in the bearing pad itself rather than by slotting the trailing ends of the pads to create the sidewall extensions as in the previously discussed embodiment. Consider well 35 in pad 20, for example. This well is machined in such a manner as to create sidewall extensions such as the one marked 32 in FIG. 3. This extension along with its opposite mate 33 is visible in FIG. 4 also. The well 35 is adjacent the leading end 30 of the bearing pad and there is a space between leading end 30 and the trailing end 31 of the next adjacent bearing pad in the direction opposite of shaft rotation. The well is not only defined by the sidewall projections 32 and 33, but also by circumferentially spaced apart walls 50 and 51 as one may see in FIG. 3. Thus, well 35 is defined by the axially spaced apart sidewall extensions 32 and 33, the shaft 22 periphery and the radially inwardly presented surface 34 of the supporting ring member 11.

The principle of distributing the lubricant in the FIGS. 3 and 4 embodiment is the same as in the FIGS. 1 and 2 embodiment where carryover oil from the trailing end 31 of a bearing pad enters partly into the well 35 but most of the oil in the well 35 is cool oil delivered by the jets, 38, 39.

Note in FIG. 4 that the sidewall extensions 32 and 33 of the well are spaced apart by a distance almost as great as the axial width of the bearing pad so that oil is evenly distributed over the whole axial width of the pad. This results from the well being configured so as to develop two annular spaces 52 and 53 into which the fresh cool oil is projected.

In the FIGS. 3 and 4 embodiment, the retaining rings 40 and 41 are configured similarly to the corresponding rings in FIG. 2.

Although embodiments of the invention have been described in considerable detail, such description is intended to be illustrative rather than limiting, for the invention may be variously embodied and is to be limited only by interpretation of the claims which follow.

I claim:

1. A tilting pad journal bearing for supporting a horizontally disposed rotatable shaft, comprising:

a supporting ring member for surrounding the shaft in radial spaced relationship, a plurality of arcuate bearing pads arranged circumferentially spaced apart in the space between said ring member and the shaft, said pads having a curved radially inwardly presented bearing surface for interfacing with the shaft and having an opposite surface presented radially outwardly toward and substantially contiguous to said ring member, said pads having leading and trailing ends spaced from each other in the direction of shaft rotation, and having opposite axially spaced apart sidewalls, said sidewalls having wall extensions extending along the periphery of the shaft for defining between them an oil receiving well, said supporting ring member having an oil infeed passageway aligned with each well including a plurality of orifices through which oil is injected into the well directly toward the shaft.

2. A tilting pad journal bearing for supporting a horizontally disposed rotatable shaft, comprising:

a supporting ring member for surrounding the shaft in radial spaced relationship, a plurality of arcuate bearing pads arranged in circumferentially spaced apart relationship in the space between said ring member and the shaft, said pads having a curved radially inwardly presented bearing face for interfacing with the shaft and having an opposite radially outward face presented toward and substantially contiguous to said ring member, said pads having leading and trailing ends spaced from each other in the direction of shaft rotation, and having opposite axially spaced apart sidewalls, said sidewalls having wall extensions extending from the trailing ends of the respective pads toward the leading ends of the next pads, said sidewalls along with the trailing end of one pad and the leading end of the next pad defining an oil receiving well, said supporting ring having an oil infeed passageway aligned with each well including a plurality of orifices through which oil is injected into the well directly toward the shaft.

3. A tilting pad journal bearing for supporting a horizontally disposed rotatable shaft, comprising:

a supporting ring member for surrounding the shaft in radial spaced relationship, a plurality of arcuate bearing pads arranged in circumferentially spaced apart relationship in the space between said ring member and the shaft, said pads having a curved radially inwardly presented bearing face for interfacing with the shaft and having an opposite radially outward face presented toward and substantially contiguous to said ring member, said pads having leading and trailing ends spaced from each other in the direction of shaft rotation, and having opposite axially spaced apart sidewalls, each pad having a slot near the leading end of the pad, said slot extending through the pad from said radially outward face to said inwardly presented bearing face and extending axially of the pad but ending short of the full axial width of the pad such that the slot is bounded at it opposite ends by portions of the sidewalls to thereby define an oil receiving well, said supporting ring member having an oil infeed passageway aligned with each well including a plurality of orifices through which oil is injected into the well directly toward the shaft.

4. The journal bearing according to any one of claims 1, 2, or 3 wherein:

each pad has a riser integral with said outward face of the pad, said riser bearing on said ring member to provide a small clearance gap between said ring member and said outward face for enabling the pad to tilt.

5. The journal bearing according to claim 4 wherein said small clearance gap extends to between said outward face of the pad and said oil infeed passageway such that it is only necessary for oil injected into said well to traverse a small gap when the pad is tilted.

6. The journal bearing according to any one of claims 1, 2, or 3 wherein:

said supporting ring member is provided with an annular oil supply groove for receiving oil under pressure, said oil infeed passageway including a slot that is open on one side to said groove for receiving oil, the opposite side of said slot being bounded by a web in which there are said orifices through which oil is injected from said slot into said well.

* * * * *